United States Patent [19]

Swallow, Jr.

[11] 3,884,374
[45] May 20, 1975

[54] TRUCK LOADING SYSTEM

[76] Inventor: Albert J. Swallow, Jr., 1428 E. Lycoming St., Philadelphia, Pa. 19124

[22] Filed: Oct. 23, 1973

[21] Appl. No.: 408,792

[52] U.S. Cl. .................................................. 214/84
[51] Int. Cl. ........................... B60p 1/52; B60p 7/06
[58] Field of Search ...... 214/84, 516, 517; 269/298, 269/301, 316, 317; 105/366 R, 369 C

[56] References Cited
UNITED STATES PATENTS

| | | | |
|---|---|---|---|
| 1,585,776 | 5/1926 | Linderman | 269/317 |
| 2,769,493 | 11/1956 | Karsoe | 269/316 X |
| 3,187,683 | 6/1965 | Schroeder et al. | 214/84 X |
| 3,504,636 | 4/1970 | Adler | 105/366 R |
| 3,689,106 | 9/1972 | Young | 214/84 X |
| 3,749,268 | 7/1973 | Macomber et al. | 214/516 |

FOREIGN PATENTS OR APPLICATIONS 1,353,904   1/1964   France ................................ 214/84

Primary Examiner—Robert B. Reeves
Assistant Examiner—Frederick R. Handren
Attorney, Agent, or Firm—Weiser, Stapler & Spivak

[57] ABSTRACT

A truck loading system including a plurality of roller conveyors which are arranged longitudinally within a truck body in position to divide the body into four quadrants. The quadrants are sized to receive palletized loads and each roller conveyor is equipped with rearwardly positioned, automatic, pallet stops. The roller conveyors of each quadrant are also provided with intermediate, portable, pallet locks and optionally with drop gate type pallet stops.

3 Claims, 8 Drawing Figures

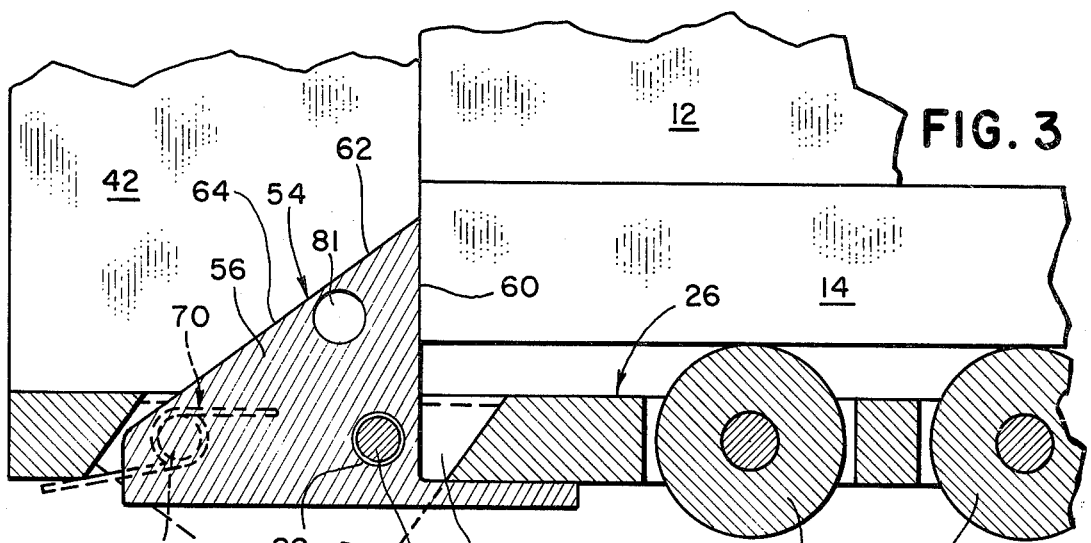
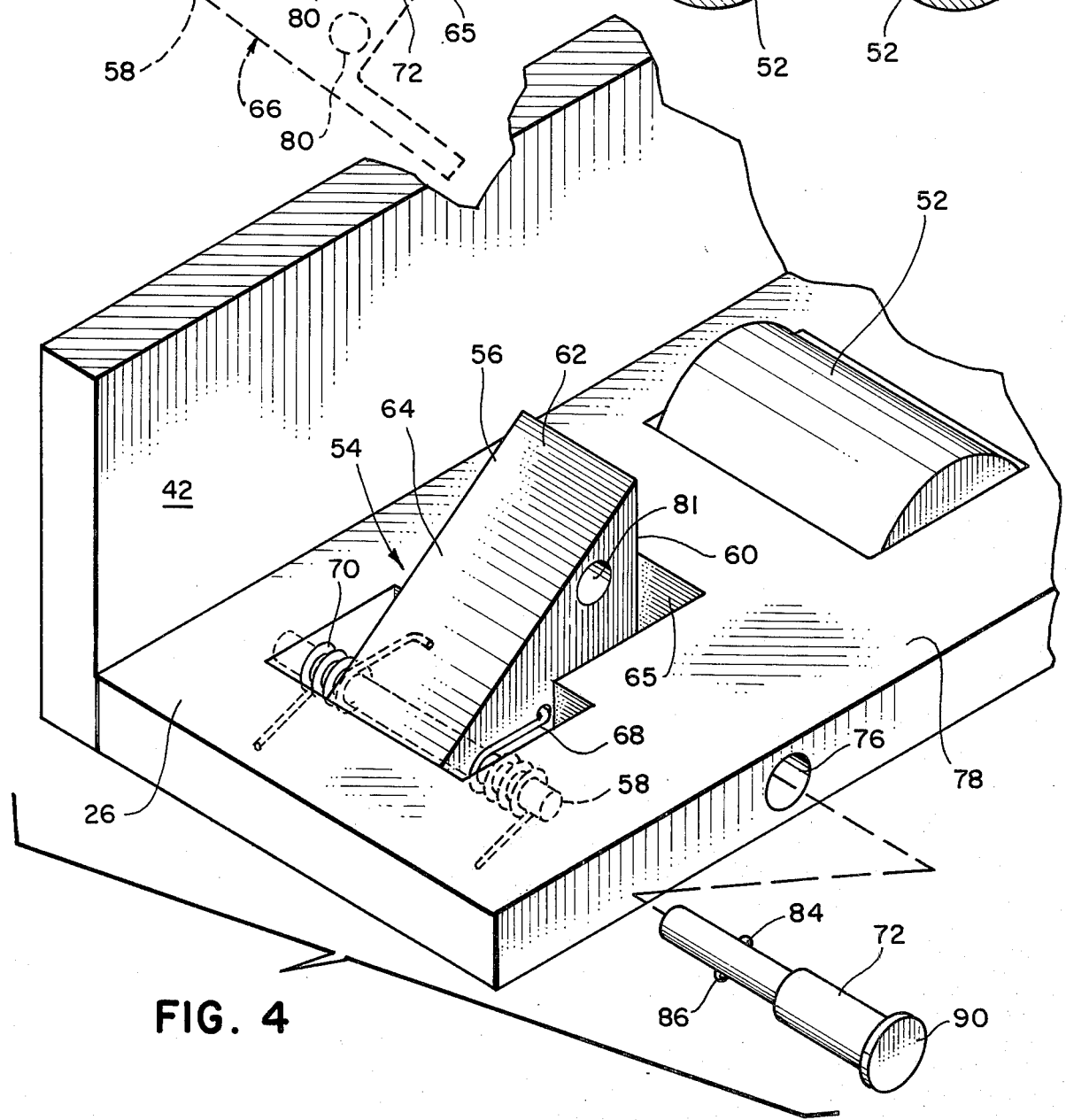

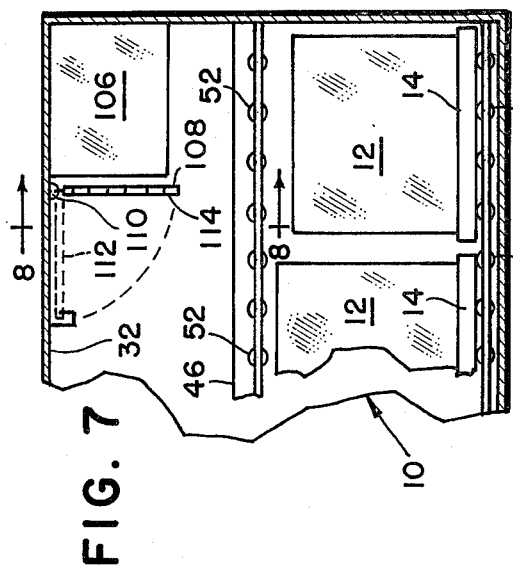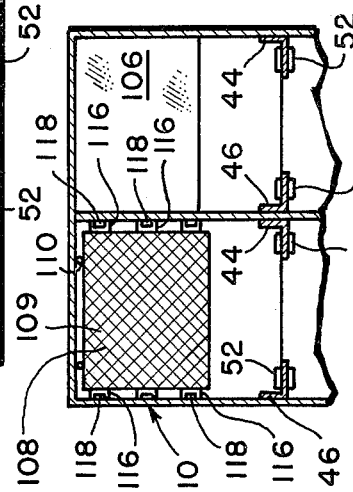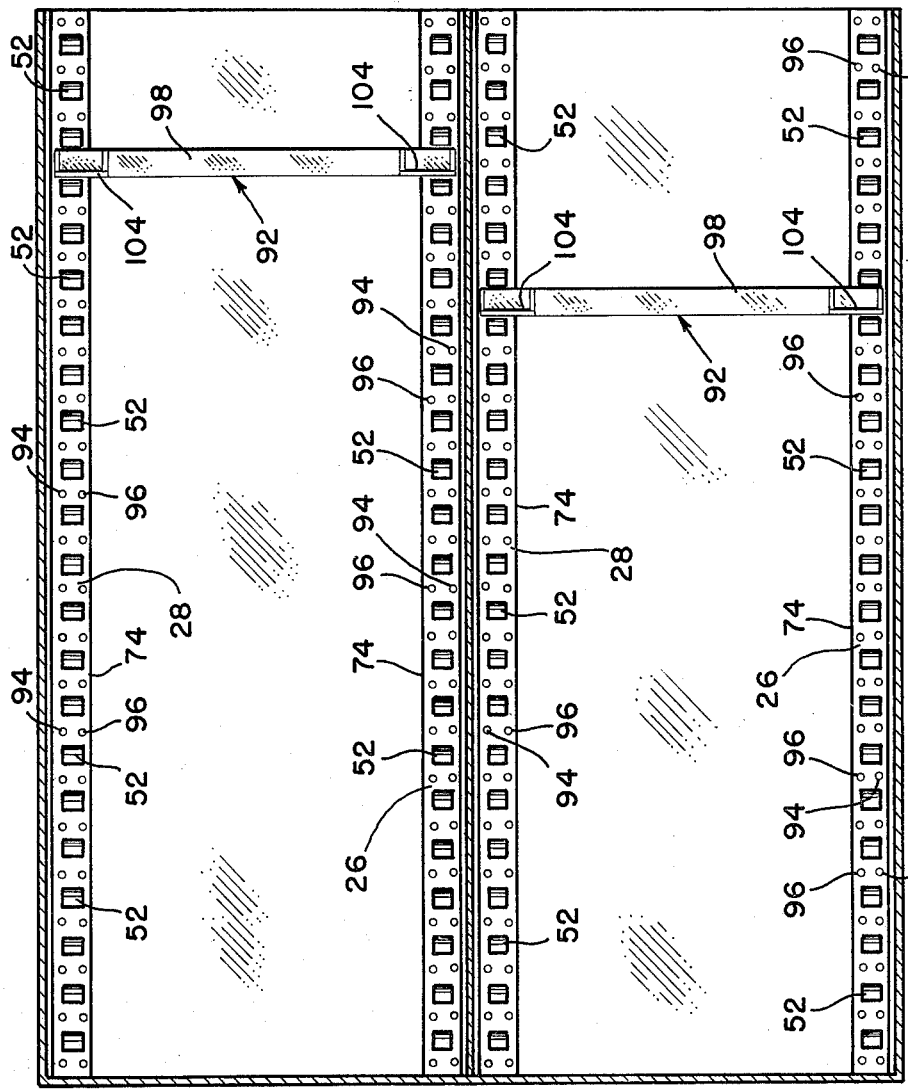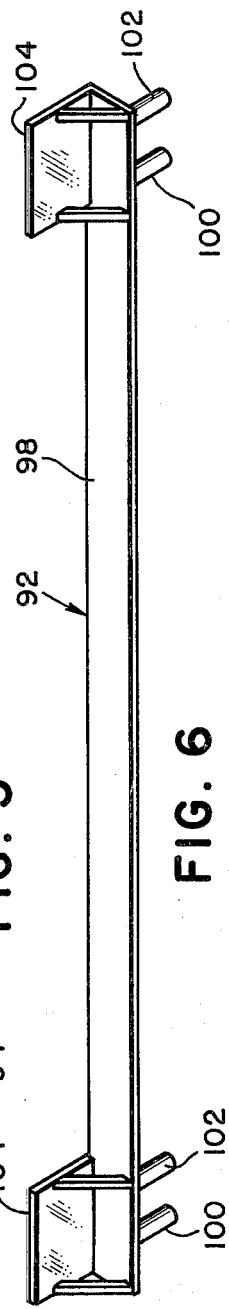

TRUCK LOADING SYSTEM

BACKGROUND OF THE INVENTION

The present invention relates generally to the field of truck transportation, and more particularly, is directed to a system designed to aid in the distribution of food products.

The trucking industry has assumed primary importance in the transportation and delivery of most products relating to home use. This is especially true in the retail food merchandising industry, commonly called supermarkets, which is directly engaged in the bulk buying and the retail distribution of food and related products. Such products are normally loaded into trailers and trucks either on pallets or in cartons at warehouse distribution locations for delivery to the individual retail supermarkets. In view of the quantities of merchandise moved each day, supermarket operators have witnessed considerable damage to the merchandise delivered by the trucks. The damage was due usually to either piling the commodities too high for the strength of the lower positioned cartons or by piling one pallet load of merchandise directly on top of another pallet load, thereby causing damage to the lower positioned material by the weight of the upper positioned goods.

When employing pallets, most transportation companies employ forklift trucks which are capable of lifting heavy pallet loads and then transporting them directly into the truck for subsequent delivery to the supermarket. Frequently, careless forklift truck operators damage the interior walls of the truck by either jamming the pallets into or along the truck walls or else actually scraping portions of the forklift truck itself along the interior walls of the truck or trailer. When trucks and trailers are not loaded using palletized merchandise, the extra hand labor thus required has proved to be quite costly and time consuming both to the hauler and to the receiver inasmuch as it takes many additional hours to both load and unload this type of loose merchandise. The unpalletized loading and unloading of trucks and trailers by hand without the benefit of mechanical equipment results in tieing up loading docks, equipment and personnel for extended periods of time.

SUMMARY OF THE INVENTION

The present invention relates generally to truck loading systems, and more particularly, is directed to a system employing a plurality of roller conveyors installed within the interior of a truck or trailer to facilitate palletized loading and unloading.

The present invention incorporates four pairs of gravity roller conveyors which are longitudinally positioned within a truck or trailer body to divide the interior area into four separate pallet holding compartments. Each compartment is approximately 43 inches wide and 48 inches high to readily receive conventional, fully loaded pallets without the need for any load adjustment.

Each pair of transversely juxtaposed roller conveyors is equipped with a portable pallet lock which includes transversely positioned bars. The bars are designed to drop into special, predrilled holes which are provided behind each roller in each roller conveyor to thereby lock the pallets in any desired longitudinal position along the roller conveyor to prevent pallet movement during transportation. The rearward end of each roller conveyor is equipped with an automatic, spring biased pallet stop which serves to keep pallets from falling out of the rear end of a compartment during highway movement of the truck or trailer.

If desired, a drop gate pallet lock may be provided to facilitate loading a partially full pallet such as may be necessary when a portion of a compartment is obstructed to render it unavailable for commodity carrying purposes. One example of a common compartment obstruction is an inwardly protruding refrigeration unit. In such a situation, the drop gate pallet lock can be dropped down into a vertical position to act as a shield to prevent commodities from falling off the pallet due to contact with the refrigeration unit.

It is therefore an object of the present invention to provide an improved truck loading system of the type set forth.

It is another object of the present invention to provide a novel truck loading system which incorporates a plurality of longitudinally arranged roller conveyors which act to subdivide a truck body into a plurality of pallet holding compartments.

It is another object of the present invention to provide a novel truck loading system including a plurality of roller conveyors longitudinally arranged within a truck body, said roller conveyors each being equipped with an end positioned, automatic, pallet stop.

It is another object of the present invention to provide a novel truck loading system which includes a plurality of roller conveyors which are arranged to subdivide the interior of the truck or trailer into a plurality of longitudinally disposed loading compartments and wherein each loading compartment is provided with a portable pallet lock to lock a palletized load in any desired longitudinal position.

It is another object of the present invention to provide a novel truck loading system including a plurality of pairs of transversely spaced, longitudinally extending, roller conveyors, the pairs of roller conveyors being positioned within a truck or trailer body to define a plurality of loading compartments, the loading compartments being sized to receive palletized loads without the need for any pallet load adjustment.

It is another object of the present invention to provide a novel truck loading system that is simple in design, rugged in construction and trouble free when in use.

Other objects and a fuller understanding of the invention will be had by referring to the following description and claims of the preferred embodiment thereof, taken in conjunction with the accompanying drawings, wherein like reference characters refer to similar parts throughout the several views and in which:

BRIEF DESCRIPTION OF THE DRAWINGS

FIG. 3 is a cross-sectional view taken along Line 3—3 of FIG. 2, looking in the direction of the arrows.

FIG. 4 is an enlarged, partially exploded, perspective view of the automatic pallet stop of FIG. 2.

FIG. 5 is a partial, top plan view showing a portable pallet stop positioned between a pair of roller conveyors.

FIG. 6 is an enlarged perspective view of the pallet stop of FIG. 5.

FIG. 7 is a partial, side elevational view of a drop type gate pallet stop.

FIG. 8 is a cross-sectional view taken along Line 8—8 of FIG. 7, looking in the direction of the arrows.

DESCRIPTION OF THE PREFERRED EMBODIMENT OF THE INVENTION

Figure 1:
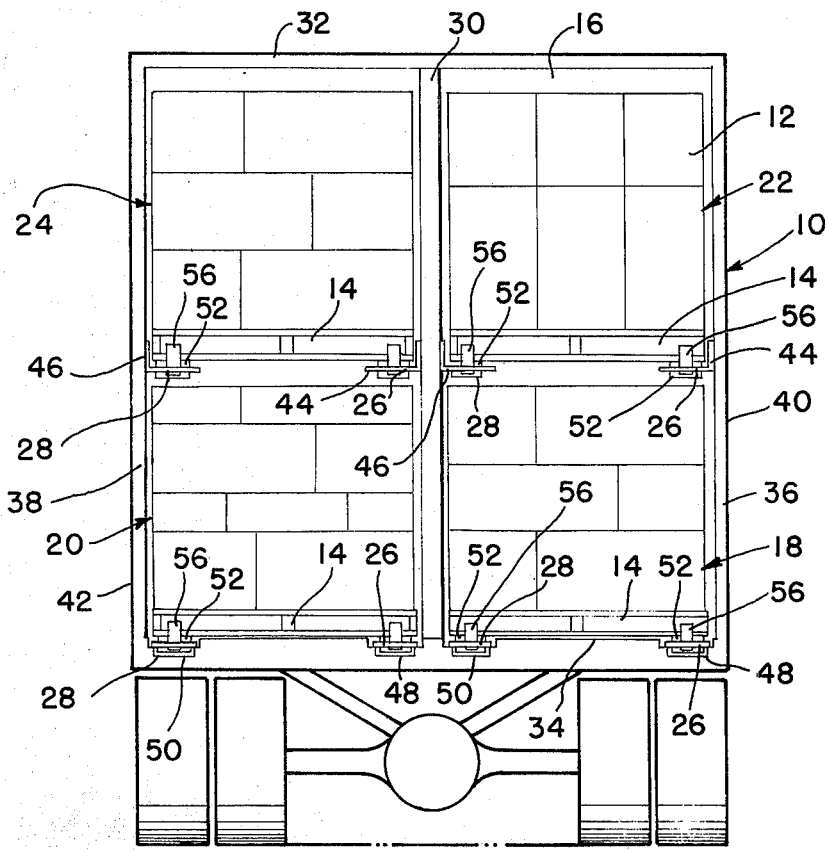
FIG. 1 is a rear elevational view of a trailer showing the invention applied in the trailer interior cargo loading space.

Although specific terms are used in the following description for the sake of clarity, these terms are intended to refer only to the particular structure of my invention selected for illustration in the drawings and are not intended to define or limit the scope of the invention.

Referring now to the drawings, I show in FIG. 1 a trailer or truck body 10 which is suitable for transporting commodities such as may be packed in cartons 12 which are first loaded upon a pallet 14. Preferably, the truck loading system of the present invention divides the truck or trailer interior space 16 into quadrants to provide two lower, longitudinally extending cargo areas 18, 20 and two upper, longitudinally extending, cargo areas 22, 24.

Each cargo area 18, 20, 22, 24 is provided with a right, gravity type, roller conveyor 26 and a transversely spaced, parallel, left gravity type roller conveyor 28. In the preferred embodiment, the right and left roller conveyors 26, 28 are spaced apart a sufficient distance to carry palletized loads which are approximately 43 inches in width. The right and left roller conveyors 26, 28 of the upper cargo areas 22, 24 are spaced above the roller conveyors of the lower cargo areas 18, 20 approximately 48 inches to readily receive palletized loads of conventional height. Accordingly, each of the upper and lower cargo area quadrants 18, 20, 22, 24 is constructed to cross sectional dimensions of approximately 43 inches in width by 48 inches in height to receive conventional pallet loads without any need to adjust the cartons 12 or other containers which have previously been loaded thereon.

In order to construct the cargo quadrants 18, 20, 22, 24, the trailer interior space 16 is horizontally divided by employing a plurality of center positioned, longitudinally spaced, support rails 30 which are suitably structurally supported in the trailer ceiling 32 and in the trailer floor 34. Conventional angle connectors and bolts (not shown) may be employed for this purpose. Sufficient center support rails 30 are provided to carry the centrally positioned, upper, right and left roller conveyors 26, 28 in substantially horizontal alignment without sagging or deflection under the loaded weight of the palletized cartons 12. Similarly, a plurality of longitudinally spaced, right and left support rails 36, 38 are affixed to the trailer side walls 40, 42 to carry the outer, upper, right and left roller conveyors 26, 28 without sagging or deflection under load. Preferably, the center support rails 30, the right support rails 36, the left support rails 38 and any top framing which may be employed (not illustrated) are fabricated of steel bar stock or angle iron of suitable strength for the purpose. The components are conventionally welded or otherwise secured together to form a unitary frame work of adequate strength and design to fully support the load.

Each of the roller conveyors 26, 28 is fabricated of the conventional, gravity, roller conveyor type and each extends substantially the entire length of the trailer or truck body 10 to facilitate the loading or unloading of fully loaded pallets into the truck interior space 16 at the quadrant cargo areas 18, 20, 22, 24 thereof. Preferably, the right upper roller conveyor 26 and the left upper roller conveyor 28 are carried upon respective, horizontally arranged, angle iron supports 44, 46 which are conventionally affixed to the plurality of right and left support rails 36, 38 and the plurality of center support rails 30 in suitable manner such as by welding or bolting. The lower right and left roller conveyors 26, 28 are carried upon the trailer floor 34 and suitable right and left longitudinally extending troughs 48, 50 are set into the trailer floor 34 to accommodate the respective right and left roller conveyors 26, 28 in a manner to permit the conveyor rollers 52 to freely roll about their respective roller shafts 53 without binding in the troughs 48, 50. The shafts 53 are conventionally supported in the conveyor bases 74 to facilitate free wheeling of the rollers 52.

Figure 2:
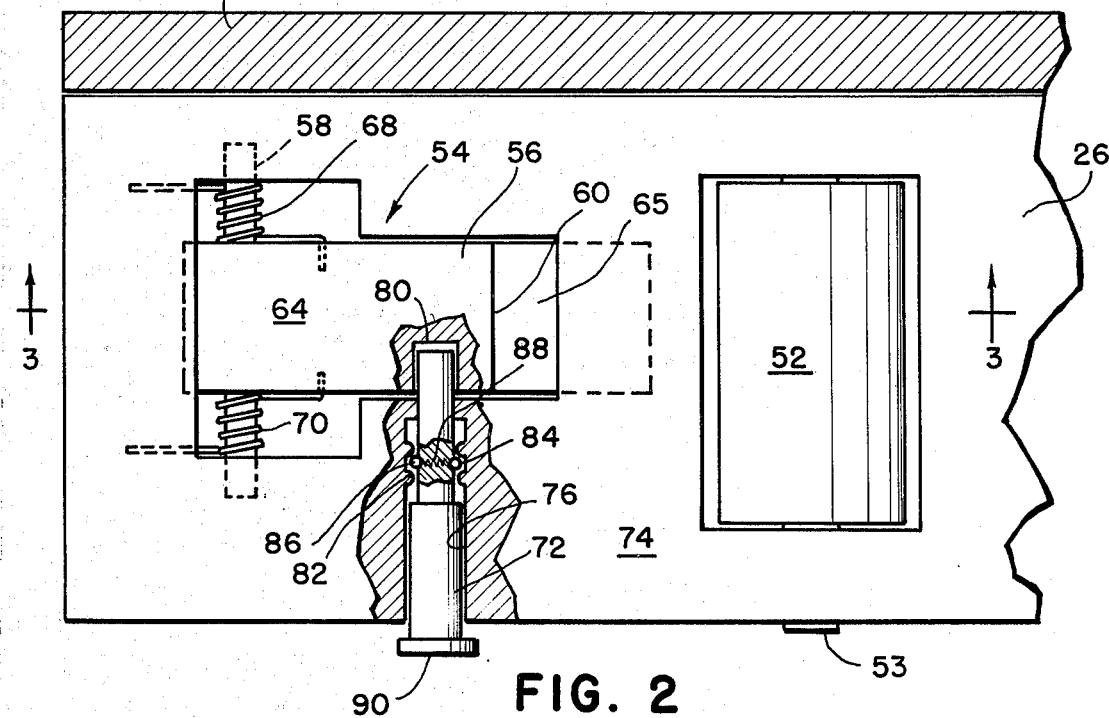
FIG. 2 is an enlarged, partial, top plan view of an automatic pallet stop, partially broken away to expose interior construction details.

Referring now to FIGS. 2, 3 and 4, I show an end-of-run automatic pallet stop assembly 54 which is pivotally arranged at the trailing edge of each roller conveyor 26, 28 for load securing purposes during movement of the trailer body 10. A generally wedge shaped detent 56 is pivotal about a pin 58 which is retained within the roller conveyor base 74. The detent 56 includes a stop surface 60 which is vertically arranged when the detent is in its locked position (FIGS. 3 and 4) for load stopping purposes. When a pallet 14 is urged into the truck interior space along the right and left coller conveyors 26, 28 in one of the quadrants 18, 20, 22, 24, the pallet 14 contacts the inclined surfact 64 of the detent 56 and urges the inclined surface 64 to assume a horizontal position by pivoting the detent 56 into the well 65 to the loading position 66 which is indicated in phantom lines in FIG. 3. Right and left springs 68, 70 position within the well 65 which is formed in the conveyor base 74 and upon the pin 58. The springs 68, 70 bias between portions of the detent 54 and the roller conveyor base 74 in a manner to continuously urge the detent to the load locking position 62. Thus, once a pallet 14 has been pushed into the trailer body 10 by pivoting the inclined surface 64 of the detent 54 to the loading position 66, the springs 68, 70 automatically function to bias the detent 56 about the pin 58 to the locked position 62 as in FIGS. 3 and 4, thereby preventing a palletized load from spilling from the truck body 10 during shipment.

As best seen in FIGS. 2 and 4, a lock pin 72 is preferably provided in association with each detent 56 to prevent the possibility of accidents whereby a detent might be unintentionally depressed during transportation of a loaded trailer or truck body 10. The conveyor base 74 is provided with a transverse, circular channel 76 which is drilled or otherwise machined completely through the base into the detent well 65. The detent 56 is provided with a corresponding hole 80 (FIG. 2) which aligns with the conveyor base channel 76 when the detent 56 is biased to the locked position 62. Additionally, the detent 56 is provided with a second hole 81 (FIGS. 3 and 4) which aligns with the conveyor base pin channel 76 when the detent is pushed to its loading position 66 to permit the pin 72 to lock the detent in the loading position. The pin channel 76 is provided with an interior peripheral groove 82 for pin securing purposes. As illustrated in FIGS. 2 and 4, the pin 72 is preferably provided with a pair diametrically opposed, radially extending, peripherally positioned balls 84, 86 which are continuously biased outwardly by a spring 88 in a well known construction. The spring biased balls 84, 86 seat within the peripheral groove 82 when the pin 72 is fully seated to thereby retain the pin in the locked position. Thus, in order to secure the detent 56 in the locked position 62, the detent hole 80 is aligned with the pin channel 76 and then the pin 72 is pushed into the pin channel 76 until the balls 84, 86 seat within the peripheral groove 82. (FIG. 2). In this position, the pin 72 ties the detent 56 to the conveyor base 74 to thereby prevent pivoting about the detent pin 58. When it is desired to unload the trailer, the pin 72 is grasped by the head 90 thereof and outwardly directed forces are applied to sufficiently compress the spring 88 to allow the balls 84, 86 to ride out of the peripheral groove 82.

Referring now to FIGS. 5 and 6, I show a portable pallet stop 92 which can be employed in any longitudinal position along a pair of roller conveyors 26, 28 to retain a palletized load in any desired longitudinal position when the trailer interior space 16 is not entirely filled. The bases 74 of each right and left roller conveyor 26, 28 are provided with pairs of transversely aligned holes 94, 96 which are drilled or otherwise provided in the base material intermediate each adjacent pair of rollers 52. As best seen in FIG. 6, the pallet stop 92 comprises a transverse bar 98 which is provided near each end with a pair of downwardly depending pins 100, 102. Above each pair of pins 100, 102 is provided a vertical stop 104 which extends upwardly above a plane drawn through the bottom of the pallet 14 when the pallet rests upon the rollers 52 to thereby serve as a barrier to prevent movement of a loaded pallet 14 past the position wherein the portable pallet stop 92 is engaged upon the right and left roller conveyors 26, 28. In order to employ the pallet stop 92, the pallet stop is first transversely aligned over a pair of right and left roller conveyors 26, 28 and then the pins 100, 102 are urged into engagement within respective transverse pairs of holes 94, 96 for pallet stop securing purposes. The weight of the pallet stop material serves to retain the pins 100, 102 in association within the holes 94, 96 under all normal conditions of travel. It will be noted that vertically directed forces would be required to disassociate each portable pallet stop 92 from its pinned connection to the conveyor bases 74. Should a pallet 14 tend to slip rearwardly within the truck body 10, during transportation, all of the forces of the loaded pallet would be imposed horizontally against the projecting vertical stops 104 of the pallet stop 92 which would then serve to positively limit such rearwardly directed movement. It will be noted that there is no vertical component of force developed upon the sliding of a pallet 94 upon the roller conveyors 26, 28 and accordingly, no forces would be generated under normal conditons which would have a tendency to pull the pallet stop 92 upwardly away from its association with the roller conveyors 26, 28.

When a truck body is provided with an inwardly projecting construction, such as a refrigerating system 106 as in FIG. 7, the cargo area quadrant 18, 20, 22, or 24 which is so affected may be equipped with a drop gate pallet stop 108 to prevent injury to the refrigerator 106 or other obstruction by the movement of the various loaded pallets 14 within the truck interior space 16. In the embodiment illustrated, one or more drop gate pallet stops 108 can be hingedly connected to the trailer ceiling 32 by means of a suitable pivot connection 110 which permits the drop gate pallet stop body 109 to be optionally positioned either in horizontal relation 112 near the truck ceiling 32 or in vertical relation 114 as seen in full lines in FIG. 7 and as illustrated in FIG. 8. When the drop gate pallet stop 108 is in the horizontal position 112, it is pivoted out of the path of the palletized loads and accordingly serves no function. When the drop gate pallet stop 108 is pivoted to the vertical position 114, it then serves as a guard to protect obstructions within the trailer space 16 such as the refrigerator 106. As best seen in FIG. 8, the drop gate pallet stop body is provided with a plurality of transversely extending ears 116 which abut the stationary stops 118 which are affixed to center support rails 30 and the right or left support rails 36, 38. The stops 118 are permanently affixed in position and prevent pivotal movement of the drop gate pallet stop 108 past the vertical position 114.

Although I have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:
1. In a truck loading system for use within a truck body having a floor and a ceiling, the combination of
   A. a right roller conveyor and a left roller conveyor secured within the truck body,
      1. said right and left roller conveyors being transversely spaced,
      2. said right and left roller conveyors extending longitudinally within the truck body,
      3. the said roller conveyors each having a base and a plurality of longitudinally spaced rollers,
      4. at least one said conveyor base including a well; and
   B. an automatic pallet stop assembly associated with said one base,
      1. said pallet stop assembly including a detent which is movable from a loading position to a locking position,
      2. said detent being movable within the well,
      3. said detent having pivotal movement within the well about a pin,
      4. the said detent having an inclined surface which inclines upwardly from a plane drawn through the conveyor base, and a stop surface, said stop surface positioning at right angles to and extending above a plane drawn through the conveyor base,
      5. the pallet stop assembly including a spring associated with the pin, the spring normally biasing the pallet stop assembly to the locking position,
      6. the pallet stop assembly including a detent lock, said detent lock including a locking pin,
      7. the detent being provided with an opening and the conveyor base being provided with a channel, the said opening aligning with the channel when the pallet stop assembly is in the locking position, the said locking pin inserting into the channel and opening to lock the pallet stop assembly in the said locking position.

2. The truck loading system of claim 1 and spring biased means provided in the pin to retain the pin in association with the channel.

3. The truck loading system of claim 1 wherein the truck body floor is provided with a longitudinally extending trough for each roller conveyor, said troughs receiving portions of the rollers therein without binding, whereby the rollers are free to rotate within the respective bases.

\* \* \* \* \*